United States Patent

Burnworth

[11] Patent Number: 5,782,455
[45] Date of Patent: Jul. 21, 1998

[54] VALVE

[75] Inventor: Douglas J. Burnworth, Confluence, Pa.

[73] Assignee: Gilmour, Inc., Newark, Del.

[21] Appl. No.: 695,343

[22] Filed: Aug. 9, 1996

[51] Int. Cl.$^6$ ............................................. F16K 31/00
[52] U.S. Cl. .......................... 251/345; 251/343; 251/344
[58] Field of Search .................................. 251/343, 344, 251/345

[56] References Cited

U.S. PATENT DOCUMENTS

| | | | |
|---|---|---|---|
| 3,425,664 | 2/1969 | Niskin | 251/344 |
| 3,788,603 | 1/1974 | Snider | 251/345 |
| 5,332,194 | 7/1994 | Austin, Jr. et al. | 251/345 |

FOREIGN PATENT DOCUMENTS

| | | | |
|---|---|---|---|
| 1223830 | 3/1971 | United Kingdom | 251/345 |

*Primary Examiner*—Denise L. Ferensic
*Assistant Examiner*—John Ball
*Attorney, Agent, or Firm*—Polster, Lieder, Woodruff & Lucchesi, LC

[57] ABSTRACT

A valve has an elongated body open-ended, with a bore with a center line extending from one end of the body to the other. The bore is interrupted by a fluid tight partition, on both sides of which, ports extend through the wall of the body. An elliptical seat is formed on the outer surface of the body between the ports, the seat or channel being diagonal as viewed in side elevation with respect to the bore center line. A sleeve is rotatably mounted on the body. The sleeve has a smoothly cylindrical bore extending from an inlet end to a diagonal, radially outwardly extending annular shelf, between the first cylindrical bore and a second bore that is radially larger than the first bore. Channel-defining ribs extend parallel to the center line, from the shelf to a point short of the outlet end of the sleeve. The ribs have a radially inner face formed on the same radius as or slightly larger radius than the first bore. A seal in the elliptical seat in the closed position of the valve is in uniform engagement with the smooth cylindrical first bore throughout its perimeter, and in its open position is at least in part in engagement with the radially inner surfaces of the ribs, whereby in the open position, liquid flowing through the ports on one side of the body partition can flow in the channels defined by the ribs to the outlet ports, hence through the valve, but in the closed position, the engagement of the seal with the uniformly smooth, uninterrupted first bore prevents liquid from flowing past the seal.

5 Claims, 3 Drawing Sheets

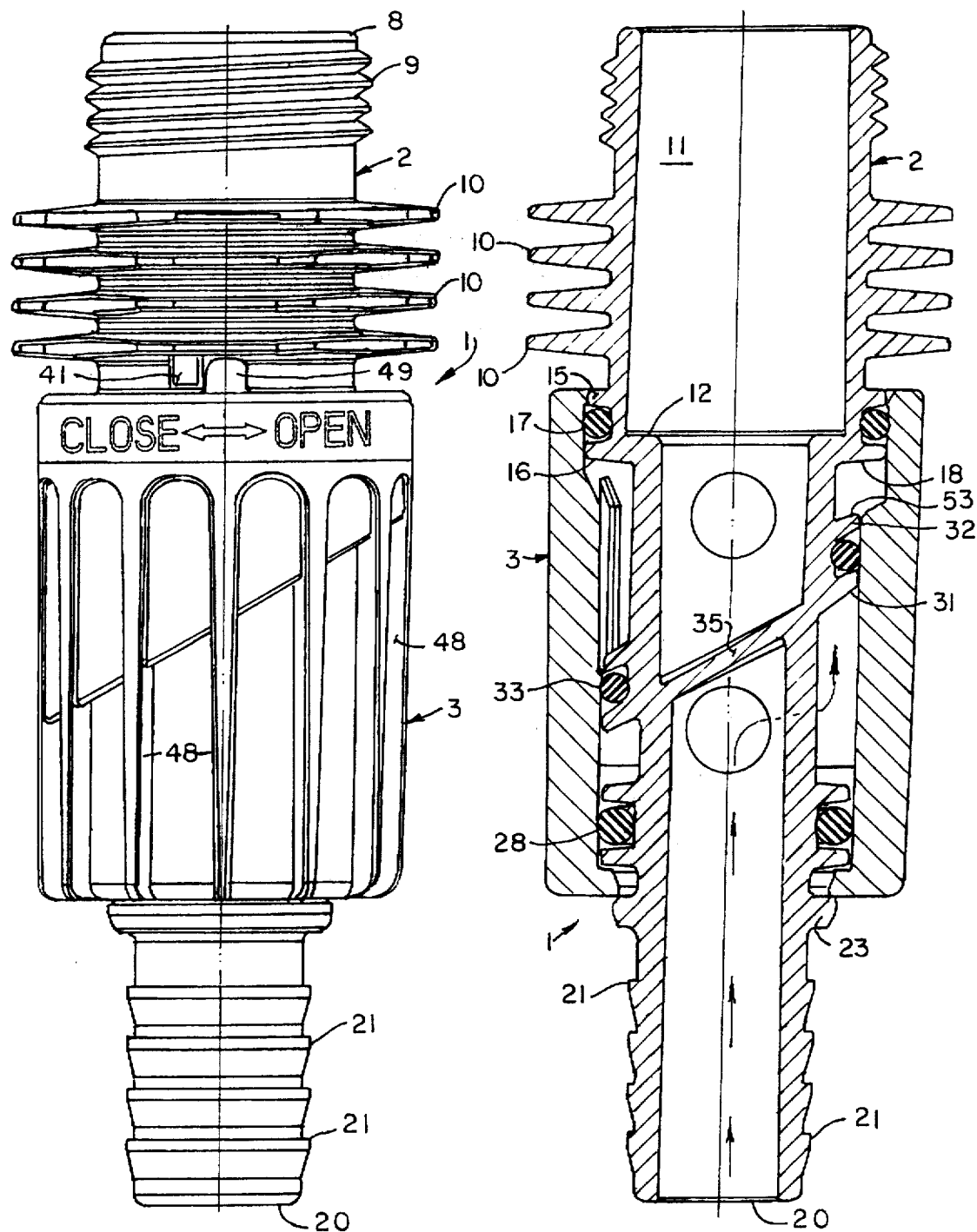

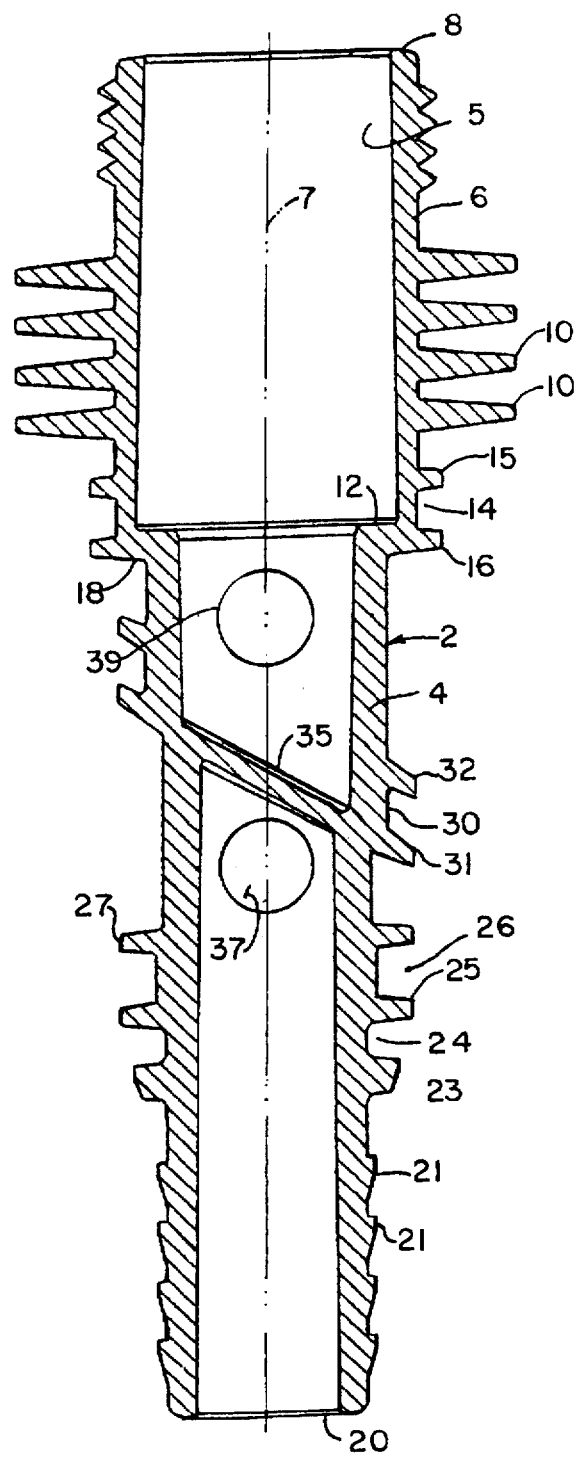
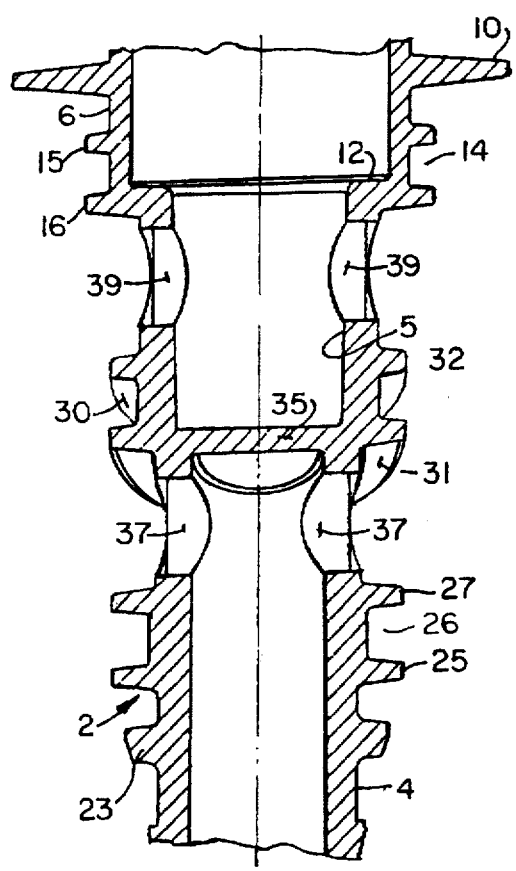
FIG. 6
FIG. 7

VALVE

BACKGROUND OF THE INVENTION

In many applications, such as lawn sprinklers, garden hoses and the like, it is desirable to have near the outlet a valve by which the flow of water can be controlled. With conventional garden hose nozzles, the flow can be shut off, but the spray pattern changes from coarse to very fine in the process.

One of the objects of this invention is to provide a streamlined valve that is readily installed immediately adjacent a nozzle or lawn sprinkler or the like, by which the flow of water can be regulated or turned off completely.

Other objects will become apparent to those skilled in the art in the light of the following description and accompanying drawing.

SUMMARY OF THE INVENTION

In accordance with this invention, generally stated, a valve has an elongated tubular open-ended body with a longitudinal center line and a side wall, circular in plan with respect to the longitudinal center line, and a sleeve rotatably mounted on the body. The body is adapted to be connected at a first, inlet, end to a supply of liquid under pressure, and at a second, outlet end, to an outlet. Seals are provided at outlet and inlet ends of a mid section of the body, and between them, an elliptical seal, circular in plan view, and diagonal in side elevation with respect to the longitudinal center line. In the preferred embodiment, the body side wall has a first circular seal seat channel on an exterior surface of the mid section of the body at the outlet end of the mid-section, and a second circular seal seat channel at the inlet end of the mid-section remote from the first seal seat, and an elliptical seal seat channel on the exterior surface of the mid-section between the first and second seal seats. In the preferred embodiment, O-rings are seated in each of the seal seat channels. The body has an interior fluid-tight partition between the second seal seat and the elliptical seal seat, and ports through the body side wall on opposite sides of the partition lengthwise of the body.

The sleeve has a longitudinal center line. The sleeve has a hollow, open ended cylindrical wall, circular in transverse cross section. The wall has a first, uninterruptedly smooth interior wall section through a portion of its length, a second radially outwardly offset portion defining with the first section a ledge extending diagonally with respect to the longitudinal center line of the sleeve, and channel defining ribs in the off set portion extending longitudinally from the ledge toward an open outlet end of the sleeve but short thereof. A third uninterrupted section lies between the outer end of the ribs and the open outlet end of the sleeve. A radially inner face of each rib is smooth and lies on substantially the same radius as the first wall section. The first wall section is in continuous engagement with the seal in the elliptical seat in one, closed, position of the sleeve with respect to the body and the ribs are in engagement with at least a portion of the seal in a rotated, open position of the sleeve. In the closed position, water going through the ports on the inlet or pressure side of the valve is prevented from flowing through the valve by the engagement of the seal in the elliptical seal seat with the smooth uninterrupted surface of the sleeve wall. In the open position, water passing through the ports on the inlet side can flow through the channels defined by the longitudinally extending spaced ribs, through the ports on the outlet side of the partition, hence out the outlet end of the valve body. In the preferred embodiment, a race channel is provided at the inlet end of the cylindrical section of the body, an outboard race-defining wall being chamfered to slope radially inwardly toward the inlet end, and an annular, radially inwardly extending lip is provided around the inlet end of the sleeve, an inboard edge of which lip is chamfered, so that when the sleeve is assembled to the body, the lip can be cammed outwardly along the chamfered surfaces until the lip clears the inlet wall and snaps into the channel that forms the race in which the lip is then seated for rotation. The valve body has molded into it a stop against which tabs molded on diametrically opposite sides of the outlet edge of the sleeve abut in the fully open and the fully closed position of the sleeve. In the illustrative embodiment shown, the inlet end of the valve body is provided with an externally serrated or corrugated section or barb, adapted to be forced into a hose to mount the valve on the hose, and the outlet end of the valve body is provided with a screw threaded section to receive an internally threaded female fitting of a nozzle or lawn sprinkler or the like.

IN THE DRAWINGS

In the drawing, FIG. 1 is a view in side elevation of one embodiment of valve of this invention;

FIG. 2 is a longitudinal sectional view of the valve shown in FIG. 1, showing the valve in closed position;

FIG. 6 is a longitudinal sectional view in a direction opposite the views shown in FIGS. 2 and 3, of the valve body alone; and FIG. 7 is a fragmentary sectional view at right angles to the views shown in FIGS. 2, 3 and 6 of the valve body alone.

DESCRIPTION OF THE PREFERRED EMBODIMENT

Figure 3:
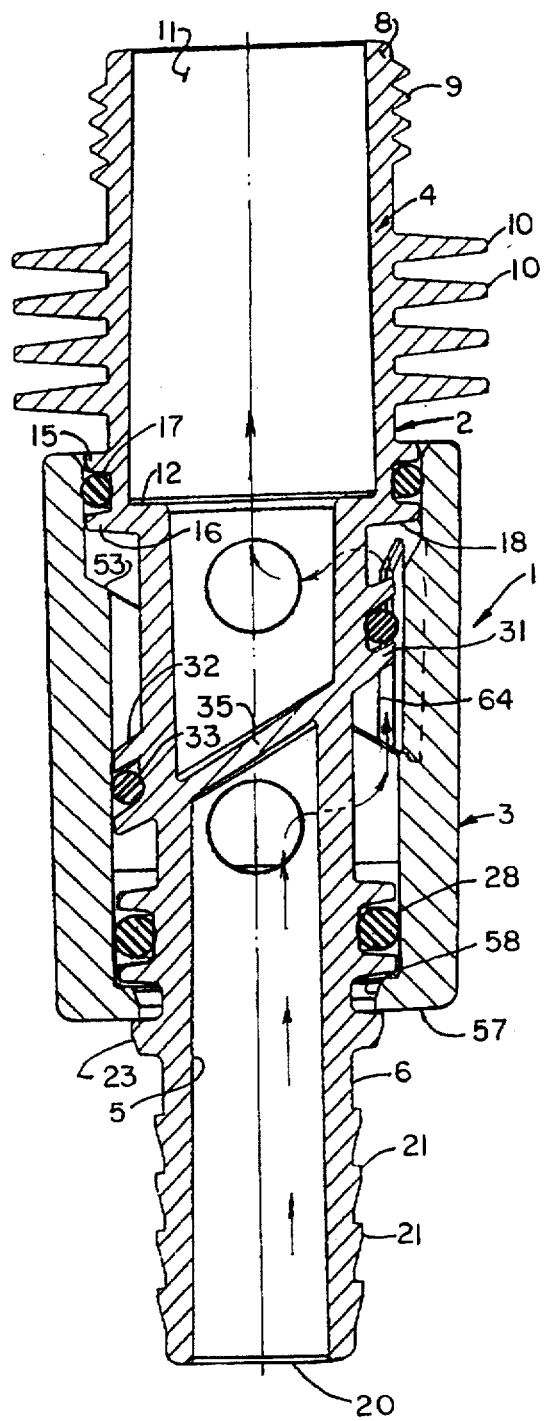
FIG. 3 is a longitudinal sectional view of the valve shown in FIGS. 1 and 2 with the valve in open position.
Figure 4:
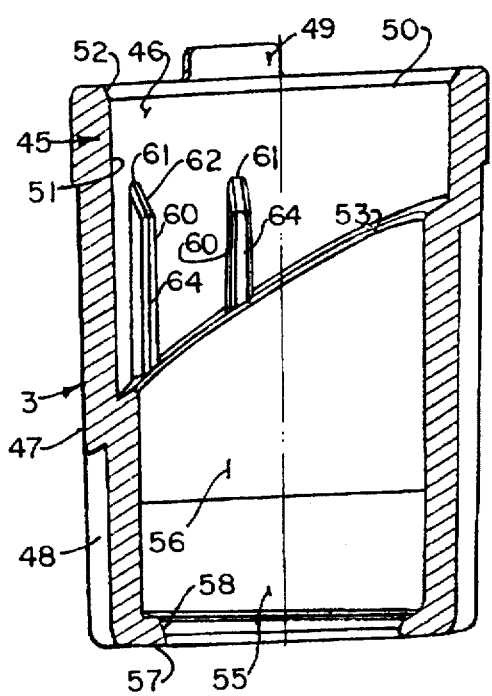
FIG. 4 is a sectional view taken along the line 4—4 of FIG. 5.
Figure 5:
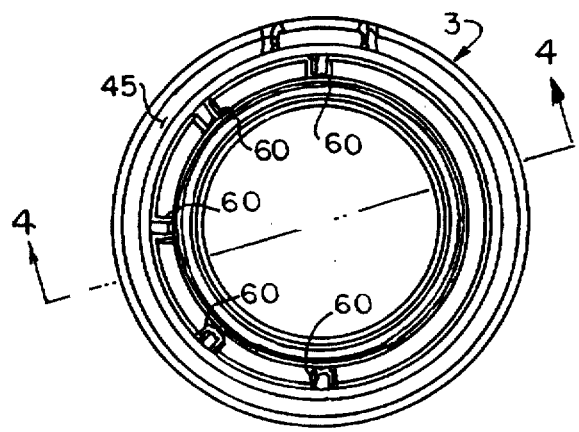
FIG. 5 is a top plan view of a sleeve member of the valve.

Referring now to the drawings for one illustrative embodiment of the valve of this invention, reference numeral 1 indicates the valve which is made up of two main elements, a body 2 and a sleeve 3. In the preferred embodiment, both parts are molded of a plastic such as polypropylene.

The body 2 has a side wall 4, with an interior surface 5 and an exterior surface 6. The body 2 is elongated and hollow, with a longitudinal center line 7. In the illustrations, an outlet or discharge end 8 of the body is shown at the top. The external surface 6 of the wall 4 has threads 9 at the outlet end, and fins 10 extending radially outwardly between the outlet end and a mid-section of the body. The terms "inboard" and "outboard" are used to indicate a direction toward and away from the mid-section of the body. The interior surface 5 describes a cylindrical conduit section 11 from the outlet end 8 to a radially inwardly extending annular ledge 12 defined by a radially inwardly stepped reduction in the diameter of the side wall 4 as compared with the diameter through the straight conduit section 11. There is a corresponding ledge 18 on the external surface of the side wall 4, from which an inboard outlet seal channel wall 16 extends radially outwardly to form a wall of an outlet end seal channel 14, the outboard side of which is formed by an annular outboard wall 15. An O-ring 17 is seated in the channel 14.

An inlet end 20 of the valve has on the exterior surface of the wall 4 a barb section 21 on which a hose can be mounted. At the inboard end of the barb section 21 an outboard radially outwardly extending wall 23, a radially outside surface of which is chamfered to slope radially inwardly toward the inlet end 20, constitutes one wall of a race 24, defined at its inboard side by a race wall 25. The wall 25 serves as an outboard wall of an inlet seal channel 26, defined on its inboard side by an inboard wall seal channel wall 27. An O-ring 28 is seated in the inlet seal channel 26.

An elliptical seal channel 30 defined by walls 31 and 32, contains an O-ring 33. The elliptical channel 30 is positioned between the inlet seal channel 26 and the outlet seal channel 14, within the mid section of the valve body. An O-ring 33 is seated in the elliptical channel. As can be seen by reference to FIGS. 2, 3 and 6, the elliptical channel is diagonal with respect to the center line 7 of the body. It will appear to be circular in plan view.

A fluid tight partition 35 extends, in this embodiment, diagonally, parallel to the inlet side wall 31 of the elliptical seat, although functionally, the partition need not be parallel to the elliptical seat. Inlet ports 37 extend through the wall 4 on the inlet side of the partition 35. Outlet ports 39 extend through the wall 4 on the outlet side of the partition 35, as shown in FIGS. 2, 3, 6 and 7.

Two stops 41 are molded into the exterior wall surface of the wall 49 immediately below the fins 10, for a purpose which will be explained below.

The sleeve 3 has a sleeve wall 45 with an interior surface 46 and an exterior surface 47. When the sleeve is mounted on the body, they have coincident longitudinal center lines. Grip ribs 48 on the exterior surface 47 facilitate turning of the sleeve on the body. A tab 49 at an outlet end 50 of the sleeve wall cooperates with the stops 41 on the body to define the fully open and fully closed positions of the sleeve with respect to the body. The tab 49 and stops 41 limit the rotation of the sleeve to one hundred eighty degrees, from fully closed to fully open position, and vice versa.

The sleeve has an inlet end 55. The interior surface 46 of the sleeve is divided into three zones: an inlet section bore with a smooth, uninterrupted interior surface 56, extending from inboard of a lip 57 at the inlet end of the sleeve to an elliptical shelf 53, extending radially outwardly with respect to the bore surface 56, and radially inwardly with respect to a rib section or zone. A chamfered surface 58 on the lip 57 cooperates with the chamfered surface of the wall 23 as will be explained hereinafter.

A multiplicity of channel-defining ribs 60 extend from the shelf 53 toward but short of the outlet end 50. The ribs are spaced, and are parallel to the longitudinal center line of the body and sleeve. The ends 61 of the ribs adjacent the outlet end of the sleeve lie in a common plane perpendicular to the center line. They are beveled or chamfered as shown at 62. Radially inner faces 64 of the ribs are all formed on the same radius as, or, as in this preferred embodiment, slightly larger than the radius of the bore 56.

A smooth cylindrical, uninterrupted bore section 51 extends between the ends 61 of the ribs and a chamfer or relief 52 on the inside surface 46 at the outlet end 50.

In assembling the valve, the O-rings 17, 33 and 28 are mounted in their respective seats, and the sleeve is slipped over the inlet end of the body, and forced upward, the chamfer 52 facilitating the compression of the O-ring 17 and the chamfer 53, the compression of the O-rings 33 and 28, until the lip 57 is cammed by the cam surfaces 23 and 58, over the wall 23 to snap into the race 34.

When the sleeve is rotated to its closing position, the O-ring 33 of the elliptical seat engages the smooth and uninterrupted inner surface 56 of the wall 4, as shown in FIG. 2. In that position, liquid coming through the inlet end 20 passes through the inlet ports 37, but is prevented from going any farther by the O-ring 33. When the sleeve is rotated so that the ribs 60 engage the surface of the O-ring nearest the outlet end of the body, the ribs permit liquid flowing through the inlet ports 37 to move through the channels between the ribs, thence through the outlet ports 39, through the conduit section 11. In an intermediate position, the available channels are fewer so that the flow is restricted.

As is evident from the fact that the faces 64 of the ribs lie on the same radius as or slightly greater radius than that of the uninterrupted surface of the bore 56, the engagement of the ribs with the O-ring 33 does not require any compression or expansion of the O-ring, so that rotation of the sleeve is uniformly smooth and wear of the O-ring is minimized.

The manufacture of the valve of this invention will be apparent to those skilled in the plastic molding art.

Numerous variations in the construction of the valve of this invention within the scope of the appended claims will occur to those skilled in the art in the light of the foregoing disclosure. Merely by way of example, the direction of flow of liquid through the valve can be reversed. Liquid flowing from the outlet end toward the inlet end will be blocked by the O-ring 33 in the position shown in FIG. 2, and permitted to flow when the sleeve is in the position shown in FIG. 3. More or fewer ribs can be provided, and their depth and spacing can be varied to accommodate different anticipated flow rates. The pitch of the elliptical seat can be changed to provide different opening and closing rates. Instead of circular holes in the body on either side of the elliptical seat, slots of various configurations can be employed. A cruciform arrangement of slots at the outlet side and a pair of rectangular slots both on one side of a diameter on the inlet side of the elliptical seat has been found to be particularly desirable as permitting a greater flow of liquid through the valve by virtue of an increased area of opening, the slots extending axially of the body a substantial distance. Other types of seals can be used, for example labyrinth seals, particularly for the inlet and outlet seals. The partition 35 does not have to be made diagonal nor does it have to be positioned exactly with respect to the elliptical seal seat, as long as it lies between the inlet ports 37 and the outlet ports 39. Although the preferred material from which the valve body and sleeve are molded is polypropylene, other materials can be used. The valve could be made of metal, although a metal valve is more expensive and heavier. Other means for rotatably mounting the sleeve on the body, different from the lip and race arrangement shown, can be provided, such as a retaining ring in a narrow channel. Slots extending axially through the lip can be provided to increase the flexibility of the lip to facilitate its mounting. These are merely illustrative.

I claim:

1. A valve having an elongated body, said body having an inlet end adapted to be connected to a supply of liquid under pressure and an outlet end through which liquid flows when said valve is open, said body having a cylindrical section through a mid portion of its longitudinal extent, first means for sealing an inlet end of said mid-portion, and second seal means, spaced lengthwise of said body from said first sealing means, for sealing an outlet end of said mid portion, and an elliptical seal seat on an exterior surface of said cylindrical section between said first and second sealing means, said elliptical seal seat being circular as viewed in plan and diagonal as viewed in side elevation, said body having an interior fluid-tight partition between the first and second sealing means, and ports through said side wall on longitudinally opposite sides of said partition; and a sleeve, mounted on said body for rotation with respect thereto, said sleeve having a hollow, open ended cylindrical wall, circular in transverse cross-section, said wall having a first, uninterruptedly smooth interior wall surface section through a portion of an inlet end of its length, a second, radially outwardly offset portion of said inner wall surface defining with said first section a ledge extending diagonally in side elevation, a plurality of channel-defining ribs in said offset portion extending longitudinally from said ledge toward an open outlet end of said sleeve but short thereof, and a third, uninterrupted inner wall surface section between an outer end of said ribs and an open outlet end of said sleeve, a radially inner face of each rib lying on substantially the same radius as the first wall surface section, said first surface section being in continuous engagement with a seal mounted in the elliptical seat in one, closed, position of said sleeve with respect to said body, and said faces of said ribs being in engagement with at least a portion of a said seal in a rotated, open position of said sleeve.

2. A valve having an elongated body with a longitudinal center line and a side wall, circular in plan with respect to said longitudinal center line, said body having an inlet end adapted to be connected to a supply of liquid under pressure, said body side wall having a cylindrical section through a mid portion of its longitudinal extent, a first circular seal seat on an exterior surface of said cylindrical section at an end of said cylindrical section nearest said inlet end of said body, and a second circular seal seat on an exterior surface of said cylindrical section at an outlet end of said cylindrical section remote from said first seal seat, and an elliptical seal seat on said exterior surface of said cylindrical section between said first and second seal seats, said elliptical seal seat being circular as viewed down said longitudinal center line and diagonal as viewed perpendicularly to said longitudinal center line, and seal means in each of said seal seats, said body having an interior fluid-tight partition between the second seal seat and the elliptical seal seat, and ports through said side wall on opposite sides of said partition; and a sleeve with a longitudinal center line, mounted on said body for rotation with respect thereto, said sleeve having a hollow, open ended cylindrical wall, circular in transverse cross-section, said wall having a first, uninterruptedly smooth interior wall surface section through a portion of an inlet end of its length, a second, radially outwardly offset portion of said inner wall surface defining with said first section a ledge extending diagonally with respect to the longitudinal center line of said sleeve, a plurality of channel-defining ribs in said offset portion extending third, uninterrupted inner wall surface section between an outer end of said ribs and an open outlet end of said sleeve, a radially inner face of each rib lying on substantially the same radius as the first wall surface section, said first surface section being in continuous engagement with a seal in the elliptical seat in one, closed, position of said sleeve with respect to said body, and said faces of said ribs being in engagement with at least a portion of a said seal in a rotated, open position of said sleeve.

3. The valve of claim 2 wherein the seals are O-rings.

4. The valve of claim 2 in which an annular channel is provided in the exterior surface of the body wall at said first end of the cylindrical section of the body, and said sleeve has a radially inwardly extending lip at one end, extending into said channel.

5. The valve of claim 1 wherein the body has a stop formed in an exterior surface and the sleeve has tabs engaging said stop when the sleeve is in fully closed position and fully open position.

* * * * *